United States Patent [19]

Lagström et al.

[11] Patent Number: 4,565,627
[45] Date of Patent: Jan. 21, 1986

[54] APPARATUS FOR GATHERING VALUABLE FLOATING, DISSOLVED AND SUSPENDED SUBSTANCES FROM SEA WATER

[76] Inventors: Emil G. Lagström, Essingeringen 72C, S-112 64 Stockholm, Sweden; Torbjörn E. G. Westermark, Ladugårdsvägen 5, Täley, Sweden, S-18338; Sevald Forberg, Gillerbaken 15, Bandhagen, Sweden, S-12442

[21] Appl. No.: 220,037
[22] PCT Filed: Apr. 17, 1980
[86] PCT No.: PCT/SE80/00108
§ 371 Date: Dec. 18, 1980
§ 102(e) Date: Dec. 8, 1980
[87] PCT Pub. No.: WO80/02235
PCT Pub. Date: Oct. 30, 1980

[30] Foreign Application Priority Data
Apr. 18, 1979 [SE] Sweden .............................. 7903367

[51] Int. Cl.[4] .......................... C02F 1/28; E02B 15/04
[52] U.S. Cl. .............................. 210/242.1; 210/242.4; 210/256
[58] Field of Search .................. 210/616-618, 210/670, 673, 688, 747, 692-695, 154, 155, 162, 170, 242.1, 255, 275, 278, 284, 290, 242.3, 242.4, 256, 262; 405/21, 23, 26, 75-77

[56] References Cited

U.S. PATENT DOCUMENTS

| | | | |
|---|---|---|---|
| 653,271 | 7/1900 | Tonkin | 405/76 |
| 671,685 | 4/1901 | Xander | 210/170 |
| 753,327 | 6/1904 | Roche | 210/242.1 |
| 763,325 | 6/1904 | Roche | 210/242.1 |
| 799,180 | 9/1905 | McClintock | 210/255 |
| 799,829 | 9/1905 | Church | 210/162 |
| 1,099,085 | 6/1914 | Hale | 405/77 |
| 1,507,461 | 9/1924 | Chase | 405/75 |
| 3,483,983 | 12/1969 | Lindstrom | 210/167 |
| 3,854,291 | 12/1974 | Perkins | 210/170 |
| 3,932,278 | 1/1976 | Meidl et al. | 210/794 |
| 4,146,482 | 3/1979 | Shyu | 210/242.3 |
| 4,297,219 | 10/1981 | Kirk et al. | 210/669 |

FOREIGN PATENT DOCUMENTS

| | | | |
|---|---|---|---|
| 2558751 | 5/1977 | Fed. Rep. of Germany. | |
| 0487416 | 7/1918 | France | 210/170 |
| 0633998 | 2/1928 | France. | |
| 1324433 | 7/1973 | United Kingdom | 210/242.3 |

*Primary Examiner*—Peter Hruskoci
*Attorney, Agent, or Firm*—Pennie & Edmonds

[57] ABSTRACT

Apparatus for gathering valuable substances, such as uranium, gold, silver or the like from sea water. The features characterizing the invention are that the sea waves are caused, by using the energy thereof, to rush up a ramp (2) which leads the waves into a basin from above, which thereby is filled to a level (By) higher than the external still-water surface (Ly), the water quantity within the level difference (ΔH) applying a hydrostatic pressure which brings the water in the basin to flow through one or several layers of filters (4) containing sorbing, ion-exchanging or bioactive mass, whereafter the water is directed back to the sea on a level lower than the upper edge of the ramp (2).

6 Claims, 2 Drawing Figures

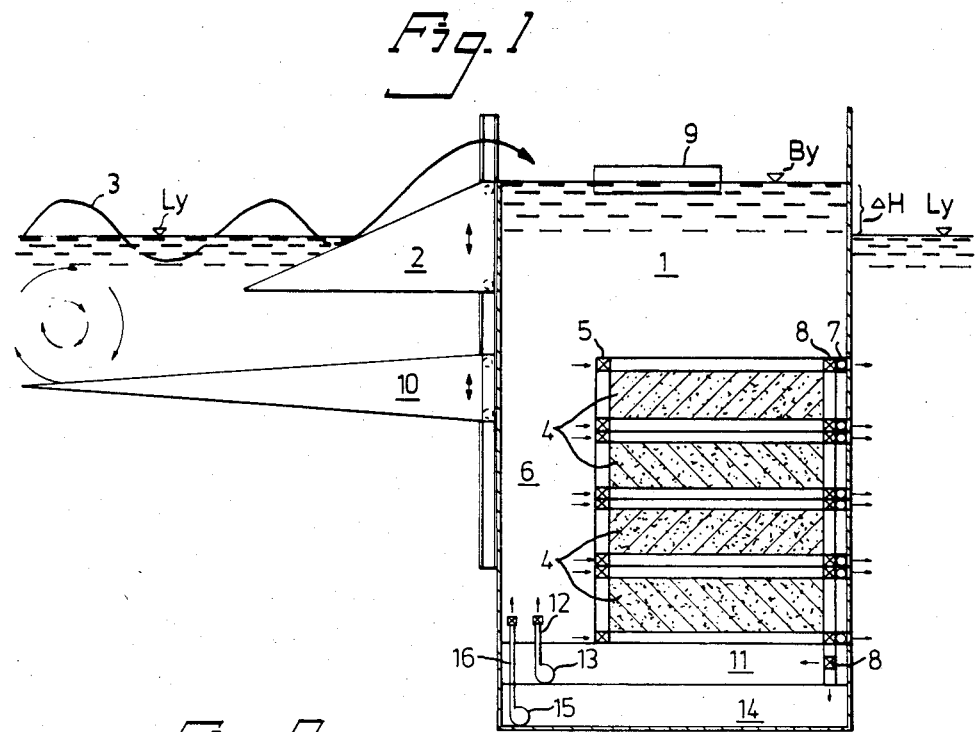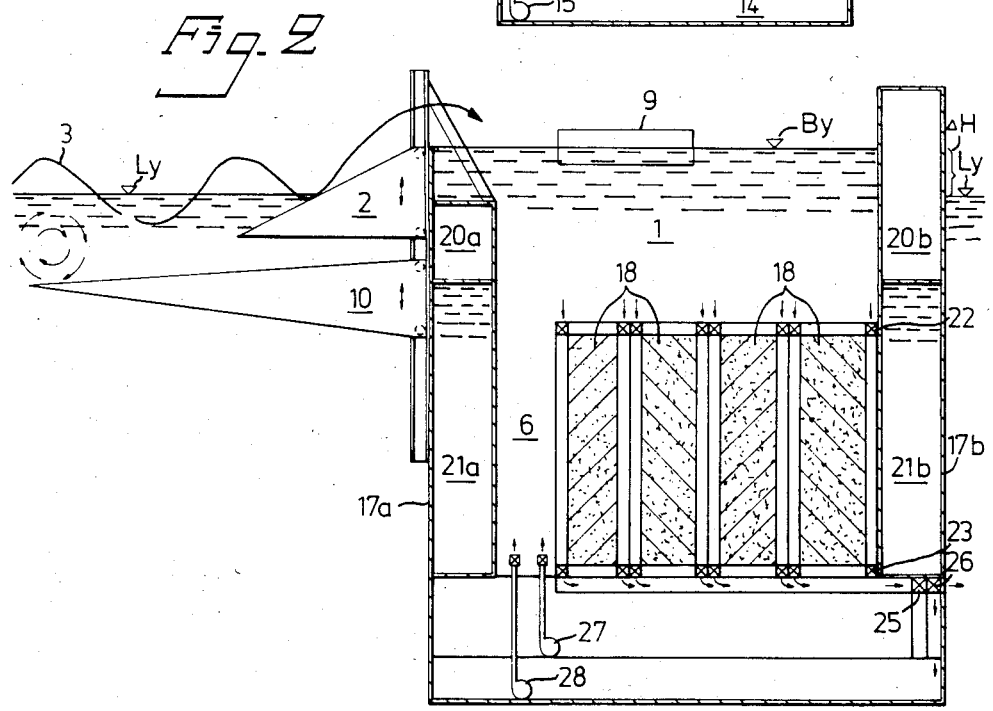

APPARATUS FOR GATHERING VALUABLE FLOATING, DISSOLVED AND SUSPENDED SUBSTANCES FROM SEA WATER

The present invention relates to an apparatus for gathering valuable substances such as uranium, gold, silver or the like from sea water.

The ever-increasing need of metals and other substances is leading to depletion of mines and the like, and thus attention is beginning to be paid to an increasing extent to the practically inexhaustable reserves, which are dissolved and suspended in the sea. A difficulty with extraction of substances from the sea water is the low concentration in which most substances are present, and thus very large quantities of water must be passing filter or sorbing bodies suitable for collecting desired substances.

A known method of collecting such substances from the sea is to tow or impel a large number of filter or sorbing bodies in the sea by means of vessels. An essential drawback of this method is however that very large energy amounts are required to keep the sorbing bodies in movement in the water during the relatively long time necessary to have a sufficient quantity of desired substance to be collected in the sorbing bodies. Due to this the method in question has turned out to be uneconomic.

An object of the present invention is to develop an apparatus by which one can ensure a sufficient flow of sea water through the filter bodies without energy requiring arrangements and thereby making possible an economically profitable extraction of desired valuable substances, e.g. gold, silver, uranium, vanadium, phosphate, oil from oil leakage, biomass, etc.

The concept forming the basis of the present invention is to utilize the great energy resource of the sea waves. In the North Atlantic the mean natural power in the waves is about 90 kW/m wave front According to trials which have been made a pontoon-carried basin having a ramp sloping towards the upper portion of the basin would lift up about 3 m$^3$ water per second and meter length of the basin to a height of about 2 m in the basin. For example, a basin 100 m long would thus give 300 m$^3$ water per second with a 2 m head to the outlet. In accordance herewith, the method of the invention is characterized in that sea waves are brought to rush up a ramp guiding the waves into a basin from above, in which the water by hydrostatic pressure is caused to flow through one or several layers of filters containing sorbing, ion-exchanging or bioactive mass, whereafter the water is returned to the sea at a level lower than the upper edge of the ramp.

The invention also relates to an apparatus for gathering desired valuable substances in accordance with the above-mentioned method. The apparatus is characterized substantially by an elongated basin having a longitudinal side adapted during use to face the approaching sea waves and on which is provided a sloping ramp adapted to lead the waves upwardly and into the basin, one or several layers of filters containing sorbing, ion-exchanging or bioactive mass for gathering desired substance being arranged in communication with the basin, said filters communicating with the basin through inlets and with the sea through outlets disposed on a lower level than the upper edge of the ramp.

Since the seas of the world are free to all nations, such pontoon-carried basins can, with the aid of the wave energy, contribute to a cheap and secure supply of raw materials for all nations, even those lacking coasts.

The invention will now be described in detail while referring to the accompanying drawing, wherein FIG. 1 schematically illustrates a vertical cross-sectional view of a first embodiment of the apparatus according to the invention, and FIG. 2 illustrates a vertical cross-sectional view of a second embodiment of the apparatus.

The first embodiment of the apparatus illustrated in FIG. 1 for gathering or collecting desired, valuable substances from the sea water has the form of an elongated, upwardly open basin 1. On one longitudinal side of the basin 1 there is provided a ramp 2, the upper surface of which sloping towards the upper edge of the basin so as to lead seawaves 3 into the basin. The height position of the ramp 2 as well as its sloping angle relative to the still water surface $L_y$ is adjustable to optimalize the water intake into the basin 1 in response to the actual height of the waves. In occasions where relatively small waves are present, a second ramp 10 may be provided to raise the wave 3 before it meets and breaks against the ramp 2 and be thrown over the edge and into the basin. Like the ramp 2, the ramp 10 may be adjustable to a suitable position. The basin should be positioned so that the waves 3 to greatest possible extent flow normal to the side of the basin 1 provided with the ramp.

In the lower portion of the basin 1 there is provided a plurality of layers of filter members 4 disposed above each other, in the example illustrated four layers, which are filled with a mass suitable for gathering desired substances, such as hydrated titanium dioxide for sorbing uranium, ion-exchanging mass or bioactive mass. Each filter layer has coordinated inlet valves 5 which could be set such that the water flows from a trough portion 6 of the basin 1 either from above and downwardly or from below and upwardly through respective filter layer and thereafter again back to the sea through outlet valves 8 and check valves 7 on the leeside of the basin 1.

In accordance with the principle of the invention, a water level $B_y$ in the basin 1 which is higher than the external still-water surface $L_y$ is obtained by using the energy of the waves to fill the basin 1 with sea water, the water quantity within the level difference $\Delta H$ applying a hydrostatic pressure which creates a water flow through the filter members 4.

Contaminants such as oil and solid floating and suspended particles or the like eventually following the sea waves 3 into the basin 1 may be drawn off by means of a skimmer 9 or the like. Further, in the bottom of the basin there is disposed a tank 11 containing a liquid killing microorganisms and the like and being now and then supplied to the filters 4 by means of a pump 13, whereafter the liquid may be brought back to the tank 11 by resetting the outlet valves 8.

Elution, i.e. the extraction of a substance entrained in the filter mass 4, such as uranium, is performed, when necessary, with the aid of an elution liquid, e.g. sulphuric acid or carbonate solution, which is stored in another tank 14, wherefrom the elution liquid is pumped to the filters 4 with the aid of a pump 15 and a coordinated pipe 16. The elution liquid and the extracted substance is then collected in a space separate from the basin 1, e.g. the tank 14. The substance can subsequently be regained and concentrated from the elution liquid, e.g. with organic ion-exchangers, before it is taken into land for further processing. The embodiment of the basin 1 illustrated in FIG. 1 is in the first place adapted to be anchored at sea, preferably in a large sea current. The basin 1 is carried by pontoon bodies not illustrated in the drawing, by means of which the height position of the basin may be controlled. Alternatively the basin 1 may be stationed firmly on land along a suitable coast. Although an anchoring at sea may involve certain difficulties, these are counterbalanced by the advantage of new water continuously flowing past, which is an important prerequisite for good yield in the filter masses. When stationing the basin at a coast, the same sea water has a tendency to move back and forth so that it will rapidly be depleted of desired substance.

In order to be industrially profitable the basin 1 must due to natural reasons have relatively large dimensions. For example, it should be noted that the length of the basin (normal to the direction of the waves) may be in the order of between about 50 and 200 m and the width thereof (from the longitudinal side to the other) may be about 20–50 m, while the depth of the basin may be about 10–40 m.

The embodiment of the basin 1 illustrated in FIG. 2 and substantially constructed in the same manner as the first embodiment is unsinkably supported by pontoon bodies 17a and 17b containing air-filled spaces 20a and 20b, respectively, and ballast tanks 21a and 21b for controlling the vertical and horizontal position of the basin 1. Check valves at the outlet of the basin 1 may hereby be dispensed, if desired. Further, the filters 18 in this embodiment are arranged vertically in the basin, so that the water is caused to flow horizontally through the filters 18 via inlet valves 22. By resetting these inlet valves 22 and outlet valves 23 coordinated with the filters, the filters may be backwashed for washing out clogging sludge or the like. In the outlet channel from the filters 18 there are provided valves 25 and 26, by means of which outflowing water from the filters 18 may be directed back again to the sea, or, alternatively, liquid killing microorganisms and elution liquid, respectively, can be directed back to its respective storage tank. Supplying the above-mentioned liquids is performed with the aid of pumps 27 and 28, respectively, in the manner described in connection with the first embodiment.

Within the scope of the invention it is possible to vary the construction and the composition of the filter members so as to obtain greatest possible exchange when gathering the desired substances. Further, it is possible to include the filters 4 and 18 in a chamber separate from the basin 1, 6, said chamber communicating with the basin 1,6 through hatches or the like, which is advantageous from a service point of view. In addition, the consumption of elution and washing liquid may be limited. The pipes 12 and 16 are then directly connected to the filter chamber.

The invention is of course not limited to the embodiments illustrated and described, but could be varied within the scope of the following claims.

We claim:

1. An offshore plant for recovery of valuable materials from sea water comprising an elongated floating unit having a basin and adapted to be anchored in a sea current with one of its sides facing the approaching sea waves and in which said basin extends above the still-water surface of the sea water, at least one sloping ramp attached to the side of the unit facing the approaching waves for leading the waves into said basin from above to fill said basin with sea water, at least one layer of filters for sorbing the materials from the sea water in communication with said basin through intake valve means located in the basin to permit the water to pass through the filters by means of the hydrostatic pressure caused by the filling of the basin by the waves to above the still-water surface of the sea water and outlet valve means located below the still-water surface of the sea water for discharging the water passed through the filters back into the sea.

2. An offshore plant according to claim 1, wherein the floating unit comprises buoyancy means for adjusting the vertical and horizontal position of the unit as well as the height level of the sloping ramp.

3. An offshore plant according to claim 2 wherein the ramp is vertically movably mounted to the longitudinal sidewall of the floating unit.

4. An offshore plant according to claim 1 wherein the angle of the sloping ramp relative to the still-water surface is adjustable.

5. An offshore plant according to claims 1, 2 or 4 wherein the layers of filters are arranged horizontally above each other.

6. An offshore plant according to claims 1, 2 or 4 wherein the layers of filters are arranged vertically beside each other.

* * * * *